L. Watson,
Drag Saw,
N°36,544.    Patented Sep.23,1862.
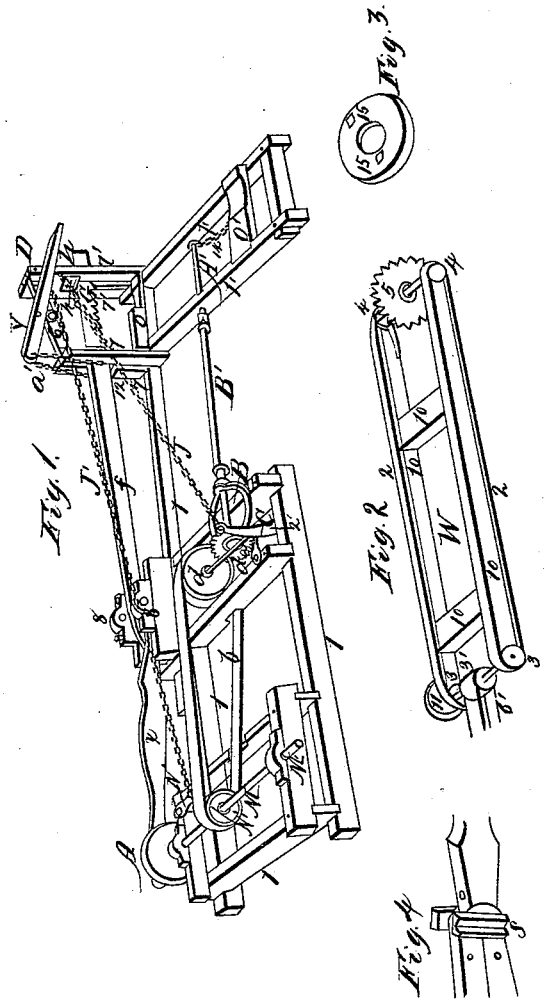
Witnesses
A S Verin
Geo. O. Robinson
Inventor.
Lewis Watson

UNITED STATES PATENT OFFICE.

LEWIS WATSON, OF CANTON, MICHIGAN.

IMPROVEMENT IN WOOD-SAWING MACHINES.

Specification forming part of Letters Patent No. 36,544, dated September 23, 1862.

*To all whom it may concern:*

Be it known that I, LEWIS WATSON, of Canton, in the county of Wayne and State of Michigan, have invented a new and Improved Machine for Sawing Wood, which machine is known as "Watson's Improved Power Wood-Sawing Machine;" and I do hereby declare that the following is a full, clear, and exact description of the construction and operation of the same, reference being had to the annexed drawings, making a part of this specification, in which—

Figure 1 is a perspective view of the machine with the saw in its position when at rest. Fig. 2 represents a swinging frame, now detached, supporting a circular saw to be used in cutting logs less than one foot in diameter. Fig. 3 is a driving-pulley, also detached. Fig. 4 is a section of the pitman and stock of the saw, showing the construction of the crosshead.

The nature of my invention consists in the arrangement of the different devices hereinafter described and their application to the purposes of sawing wood, whereby logs of wood of any size and length placed upon the slide or carriage of the machine may be moved to the saw and cut to any desired length, thereby effecting a great saving of time and labor and accomplishing the work in a more uniform and desirable manner.

To enable others skilled in the art to make and use my invention, I will proceed to describe its construction and operation.

I construct the frames of my machine, 1 1 1 1 and 1' 1', of timbers of any desired size and length, without tenons or mortises, by cutting gains in the main or bed pieces to receive the cross-pieces. I also cut gains to receive the said cross-pieces in the lower side of the timbers supporting the bearings of the different shafts and secure all the connections or crossings with iron bolts.

M is the main shaft of the machine, to which the power is applied at $m'$ by means of a driving-pulley or couplings. (Not represented.)

N is a band-pulley, from which motion is communicated to the arrangement for moving up or feeding the log to the saws.

A is a crank-pulley, from which a reciprocating motion is communicated to the saw by the pitman $x$ and the saw-stock $f$, connecting the saw G with the pulley A.

8 8 are the bearings of the shaft of the balance-wheel 11 in Fig. 2, the base of which bearings constitutes the ways of the slide S, Fig. 4.

7 7 are upright posts, which support the beam 6 and serve as a guide to the saw-stock $f$. They also constitute the ways of the drop 12. 7' 7' are similar upright posts constituting the ways of the weight $h$.

Y is a lever, attached to the drop 12 by means of the cord $a'$, and by means of which the saws are raised up when it is desired to move up the log for another cut.

D is a coupling-pin, the head of which serves as a rest for the lever Y.

The saw G is held and pressed to its work by the weight $h$, on the under side of which a narrow gain is cut to receive the back of the saw, which gain, so cut and applied, guides the motion of the saw G.

J is a cord, by means of which the brake N is applied to the pulley A when it is desired to check the motion of the saws. The rest O supports the log, and is constructed as shown and bolted firmly to the ways of the slide O'.

A' is a cylinder, around which the chain 14 is drawn when it is desired to move up the slide O'.

B is a circle and shaft supporting the cog-wheel $a$.

B' is a trundling rod communicating motion to the cylinder A' from the shaft of the cog-wheel $a$.

C is a pinion-wheel and shaft communicating motion to the cog-wheel $a$.

2' is a vibrating post supporting the shaft of the pinion-wheel C.

$d$ is a pulley attached to the shaft of the pinion C.

$b$ is a band communicating motion to the pulley $d$.

J is a cord attached to the vibrating post 2', by means of which the cog-wheel $a$ and the pinion-wheel C are thrown into gear when it is desired to move up the slide O'.

Fig. 2, 10 10 are the timbers of the frame, which must be of sufficient length to bring the arbor or shaft of the saw 5 directly over the center between the posts 7 and 7'. The shaft of the balance-wheel 11 is to be applied to the bearings 8 8, Fig. 1, when the swinging frame W is used.

3 3 and 4 4 are belt-pulleys, and 2 2 their belts.

6' is the driving band or belt of the saw and gearing of the swinging frame W.

15 15 are the screws by which the pulley, Fig. 3, is attached at the crank-pulley A.

S, Fig. 4, represents the gain or groove cut in either side of the slide of the cross-head to receive the ways at the base of the bearings 8 8.

Having thus fully described the construction of my machine, I will now proceed to describe its operation.

Let the operator take his position near the outer bearing of the cylinder A' and within easy reach of the lever Y and the cord J J'. Let the log or wood to be cut be placed on the rest O and the slide O', power being applied to the shaft M through the medium of the driving-pulley applied at $m'$. A circular motion is given to the pulley A and N', which motion is communicated to the pulley $d$ and the pinion wheel and shaft C by the band $b$. At the same time a reciprocating motion is communicated to the saw G. Let the operator now throw the pinion-wheel C and the cog-wheel $a$ into gear by pulling the cord J, thereby communicating motion to the cylinder A, which, acting upon the chain 14, will move up the slide O'. When the log is in the desired position under the saw G, the operator lets go the cord J and the log immediately stops, the pinion-wheel C and cog-wheel $a$ being thrown out of gear by the tension of the band $b$. The lever Y is now removed from the rest D, the drop 12 falls, and the saw G is guided and pressed to its work by the weight $h$. When the saw has made its cut, it is again raised up and the above-described operation continued until the work is accomplished.

When the circular-saw is used, the pitman $x$, saw-stock $f$, and saw G are detached and the swinging frame W substituted. The saw 5 is passed to its position by removing the coupling-pin D, raising up the lever Y and the beam 6 and passing the saw over them. The shaft of the balance-wheel 11 is entered in its bearings 8 8. The pulley, Fig. 3, is applied to the pulley A and the band 6' passed over it. The machine is now operated in the same manner as before.

I do not claim as new any of the separate devices used; but

What I claim as my invention, and desire to secure by Letters Patent, is—

1. The combination of the arrangement for feeding the log to the saws, consisting of the shaft M, pulley N', band $b$, pulley $d$, pinion wheel and shaft C, vibrating post 2', cog-wheel $a$, circle B, trundling-rod B', cylinder A', chain 14, and slide O', and of the lever Y and weight $h$, with the arrangement for driving the saw G, consisting of the crank-pulley A, pitman $x$, and stock $f$, when constructed and operating substantially as and for the purpose shown and described.

2. The combination of the arrangement for feeding the log to the saws, the lever Y, crank-pulley A, and belt-pulley, Fig. 3, with the swinging frame W, consisting of the belt-pulleys 3 3 3' 4 4, the belts 2 2 6', the balance-wheel 11 and its shaft, and the saw 5 and its arbor, when constructed and operating substantially as and for the purpose shown and described.

LEWIS WATSON.

In presence of—
FRANK L. BIGGAM,
THOS. BIGGAM.